Feb. 26, 1963 E. WILDHABER 3,078,964
INDEXING MECHANISM
Original Filed April 12, 1955 2 Sheets-Sheet 1

INVENTOR:
E. WILDHABER
BY
Attorney

Feb. 26, 1963      E. WILDHABER      3,078,964
INDEXING MECHANISM
Original Filed April 12, 1955      2 Sheets-Sheet 2
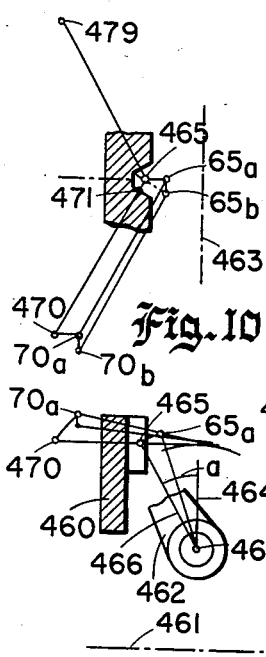
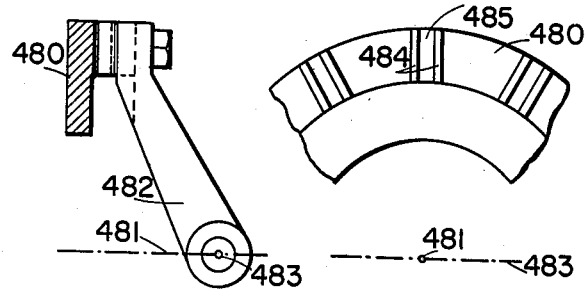
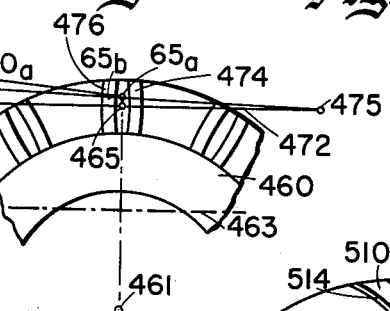
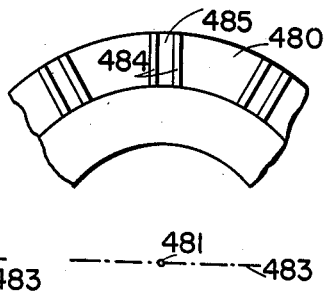
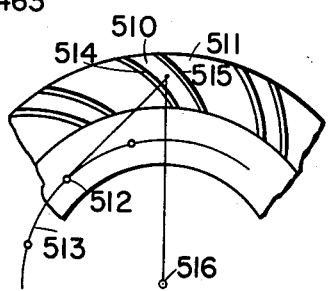
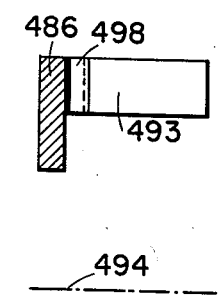
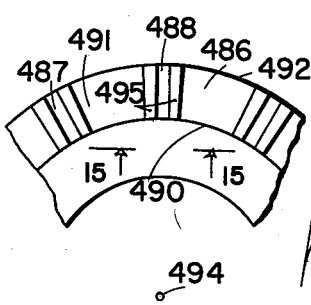
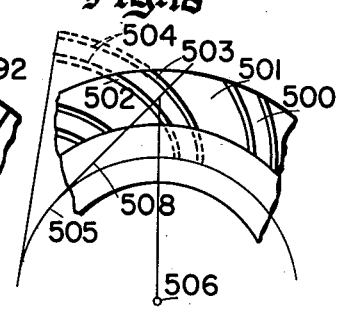
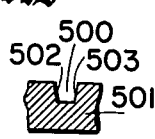
INVENTOR:
E. WILDHABER
BY
Attorney

3,078,964
INDEXING MECHANISM
Ernest Wildhaber, Brighton, N.Y.
(124 Summit Drive, Rochester 20, N.Y.)
Original application Apr. 12, 1955, Ser. No. 500,933, now Patent No. 2,934,977, dated May 3, 1960. Divided and this application Feb. 1, 1960, Ser. No. 5,833
12 Claims. (Cl. 188—69)

The present invention relates to indexing mechanisms, and especially to indexing mechanisms such as are used in gear-producing machines, and on other machines for producing articles having a plurality of identical projections or grooves. The invention has application, however, also to indexing mechanisms for the turrets of machine tools, and in many other places.

This application is a division of my copending application Serial No. 500,933, filed April 12, 1955, now Patent No. 2,934,977.

One object of the present invention is to provide a plate type index mechanism having an improved form of index plate and improved pawls or locking dogs for cooperating therewith.

A further object of the invention is to provide a plate type index mechanism which may be locked up in a plurality of places simultaneously, thereby to minimize wear and further assist in achieving mass balance.

Other objects of the invention will be apparent hereinafter from the specification and from the recital of the appended claims.

FIGS. 8, 9 and 10 are fragmentary views of an index plate made according to a further embodiment of this invention and having its notches disposed on its side face, FIG. 8 being an axial section of the index plate, and showing, also, fragmentarily the locking dog; FIG. 9 being a view along the axis of the index plate; and FIG. 10 being a partial transverse section through the index plate, taken parallel to the pivot axis of the locking dog;

FIG. 11 is an axial section showing an index plate made according to a still further embodiment of the invention, and a locking dog in engagement therewith, and illustrating the special case where the pivot axis of the locking dog intersects the axis of the index plate;

FIG. 12 is a fragmentary view taken along the axis of this index plate and looking at the active face thereof;

FIG. 13 is a partial axial section showing an index plate and a cooperating locking dog made according to a still further embodiment of the invention, the locking dog being here movable in the direction of the axis of the index plate;

FIG. 14 is an end view of the index plate shown in FIG. 13;

FIG. 15 is a fragmentary section on the line 15—15 of FIG. 14, looking in the direction of the arrows;

FIG. 16 is a fragmentary end view of an index plate, constructed according to a still further embodiment of the present invention, the plate here having notches which have involute helical side surfaces;

FIG. 17 is a normal section through one of the notches of the index plate of FIG. 16; and FIG. 18 is a view similar to FIG. 16 but showing an index plate constructed according to a still further embodiment of the present invention.

The function of an index plate is not merely a static one, not merely to hold and lock. It also has to supply the final accuracy of the work position. When the locking dog or pawl moves into locking position, the index plate is only approximately at the right place. Moreover, it may still be moving very slightly. The exact and final position is attained through the engagement of the locking dogs with the index plate. This engagement provides a correction of position, which, of course, should be very small. In accordance with the present invention, this engagement, which starts just prior to reaching full depth, is made between the sides of the notch and the sides of the locking dog or pawl, rather than between the side of one and the end corner of the other. By improving the contact near full depth position, the index is made to stand up much longer with full accuracy.

Figures 1, 2, 3:
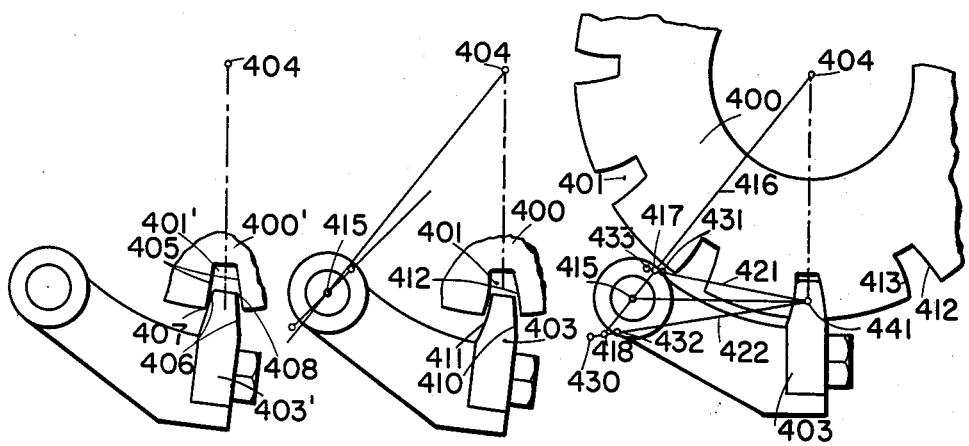
FIG. 1 is a fragmentary view showing how a conventional locking dog moves out of or into a notch of a conventional index plate.
FIG. 2 is a similar view but showing a notch of an index plate constructed in accordance with one embodiment of the present invention and a locking dog, adapted to cooperate with this index plate.
FIG. 3 is a fragmentary view of this index plate and locking dog, showing the dog in full depth engagement with the index plate.

FIG. 1 illustrates the co-action of the conventional locking dog 403' and a notch 401' of a conventional index plate 400'. The notch has straight sides 405 and the locking dog has matching straight sides 406. Half-depth position of the locking dog is shown in FIG. 1. It is seen that in this less than full depth position the locking dog 403' lies tilted in the notch 401'. If the index plate 400' is slightly displaced about its axis 404 from the position shown, either corner 407 of the notch or corner 408 of the dog will hit, depending on the direction of displacement. This is not a desirable contact. It concentrates contact stresses, and produces relatively rapid wear because of the sliding. Near full depth, where the locking dog is supposed to provide correction of position of the index plate, the tilt angle of the locking dog in the notch is smaller, but there is still corner contact; and the objection is still there.

Figures 4, 5, 7:
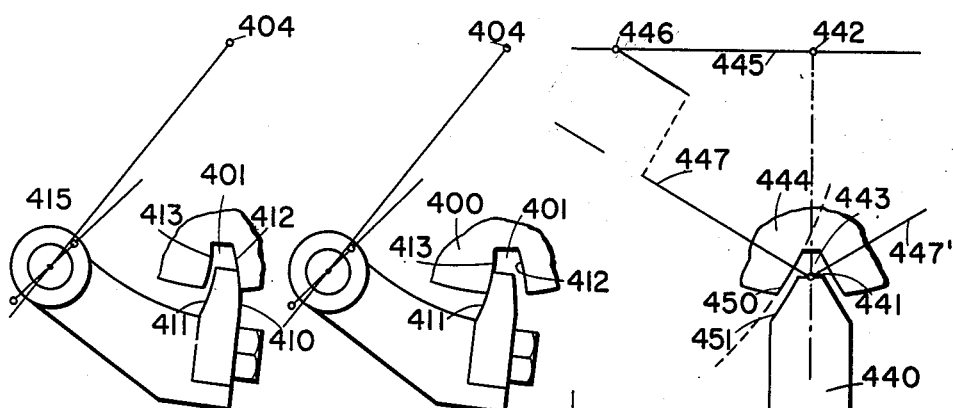
FIGS. 4 and 5 are views, similar to FIG. 2, but showing the index plate turned on its axis from the position of FIG. 2 through slight angles so that the locking dog contacts opposite sides, respectively, of a notch of the index plate.
FIG. 7 is a fragmentary view of an index plate constructed in accordance with a still further embodiment of the invention and of a radially movable locking dog adapted to cooperate with that plate.

FIG. 2 shows the same position of a locking dog 403; but the notch 401 and dog 403 are here formed in accordance with the principles of the present invention. Here the locking dog 403 continues to match the depthwise direction of the notch in part-depth positions. If the index plate 400 is displaced angularly in one direction, as shown in FIG. 4, the side 410 of the locking dog still remains essentially in contact with the side 412 of the notch. When the index plate is displaced in the opposite direction (FIG. 5) the side 411 of the locking dog remains essentially in contact with the side 413 of the notch. Objectional corner contact is avoided. FIGS. 4 and 5 show the locking dog in half-depth position, the same as in FIG. 2. Full depth position is shown in FIG. 3.

In the embodiment of FIGS. 2 to 6 the side profiles 412, 413 of the notch 401 are circular arcs. Profile 412 is concave; and profile 413 is convex. The centers 417 and 418, respectively, of these circular arcs lie approximately on the center line 416 (FIG. 3) which connects the centers 404 and 415 of the index plate 400 and of the locking dog 403, respectively, in full depth position.

When the sides of the locking dog are to match the sides of the notches exactly, then the centers 417, 418 of the sides of a notch are also the centers of respective side profiles of the locking dog.

Centers 417 and 418, which lie on center line 416, start to move at right angles to the center line when turned about the axis 404 of the index plate, and also when turned about the pivot axis 415. They move in the same direction when turned a small amount about either or both axes. This is the secret of the favorable showing of these profiles. The profile centers of the index plate and of the locking member tend to stay together, when the plate and member are turned a small amount on their axes to contact with each other.

A more general construction will now be described with reference to FIG. 6. In this diagram 404 and 415 again denote the axes of the index plate and the pivot axis of the locking dog, respectively. 420 is a mean point of a space of the index plate. The profile normals 421, 422 are the normals at full depth position. In accordance with the general principle, the shape is so determined that the mean contact normals 421, 422 tend to stay normal to the side surfaces of the notch when moved a moderate amount with the locking dog away from full depth position, while the locking dog is maintained in contact with the notch. In other words, when the normal 422 is turned about the pivot axis 415, its point 420 moves to a position 420′, and the normal remains tangent to a circle 425 centered at 415 on the pivot axis. 422′ denotes this position of the normal. In this position, however, the locking dog is not in contact with the notch. To bring it into contact, as required, the index plate or the normal is turned about axis 404. While so turned, the normal moves into a position 422″, staying tangent to a circle 426 concentric with the axis 404 of the index plate. At the small displacements considered, the turning angle corresponds to a lateral displacement 420′—420″ of point 420, where the point 420″ lies on a line 427 parallel to the tangent to the notch profile and perpendicular to the normal 422. In this new position 422″, the normal intersects the original position 422 at a point 418, the curvature center of the notch profile on that side. Point 418 thus determined is found to lie on the center line 416. Point 417 can be determined similarly by construction and is found to lie also on the center line 416.

Instead of going through the steps geometrically, they may be determined by computation. In doing so, the rules of dealing with infinitesimal quantities are preferably applied, that is, the rules of calculus. This simplifies the procedure. In other words, what we want to determine is the curvature center of the notch profile such that matching side profiles of the notch and locking dog tend to stay tangent and in contact with each other at an infinitesimal displacement away from full depth position. This produces the illustrated result.

If desired, the profile ends may be eased off slightly, as is customary on gear teeth. Then the centers of the profile in full depth position (FIG. 3) do not coincide. The convex arc 413 of the notch may then have a center 431, while the mating circular arc profile 411 of the locking dog has a center 433. Both centers 431, 433 lie on a normal 421, on which the center 417 also lies. The centers 431, 433 are adjacent the center line 416, and preferably on opposite sides thereof. The concave arc 411 has a slightly larger radius than the convex arc 413.

On the opposite side of the notch, the concave arc 412 may have a center 430, while the convex arc 410 of the locking dog has a center 432, both located on the normal 422.

The slight modification in profiles thus achieved does not alter the principles; and it makes the parts less sensitive to slight errors and deflections, and is generally helpful. It applies to all embodiments of the invention.

FIG. 7 shows a further modification of the index plate and locking dog. Here the locking dog 440 is movable in a straight radial line 441—442 to and from locking engagement with the notch 443 of the index plate 444. Mathematically, this motion can be considered a motion about a pivot axis infinitely far away in the direction of the line 445, which is at right angles to the direction of the motion of part 440. Line 445 is then the center line, the line connecting center 442 of the index plate with the center of the motion; and the profile center 446, except for ease-off, should lie on this center line 445. It is its intersection with the respective normal 447 passing through the mean point 441. Here, then, both sides of notch 443 should be convex, convex arcs 450 centered on one side on line 445 at 446. The profiles 451 of the locking part 440 are corresponding concave circular arcs.

Figure 6:
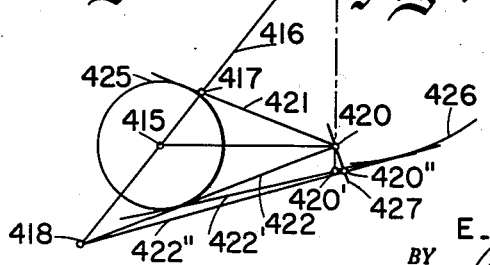
FIG. 6 is a diagram explanatory of the general determination of the shape of a notch of the index plate.

FIGS. 6 and 7 show the inclination of the side profiles exaggerated for convenience in illustration. However, any desired profile inclination may be chosen; and it does not have necessarily to be equal on the two sides.

The principles of notch design, in accordance with the present invention, apply also with notches provided on the side of the index plate.

FIGS. 8 to 10 illustrate one such design. Here the index plate 460 has an axis 461; and the locking dog 462 is pivoted on an axis 463 which is offset from axis 461 and lies in a plane 464 perpendicular to the axis 461. 465 denotes the mean point of the notch space. Plane 466 containing the pivot axis 463 and mean point 465 is inclined at an angle $a$ to the plane 464.

Point 470 lies on the normal through point 465 to the notch 467, at a given distance from this mean point 465. This distance appears in full length in FIG. 10. The normal 465—470 intersects the notch side surface at a point 471 of the profile of one side of the notch.

In accordance with the general principles, the considered normal 465—470 is first turned through a small angle about pivot axis 463, whereby the points 465 and 470 move to positions 65a and 70a, respectively. In this displacement, the normal 65a—70a remains tangent to a circle centered on the pivot axis 463 in the view of FIG. 8. From this position the normal should be turned about the axis 461 of the index plate until the considered side of the locking dog is again in contact with the notch. That is, point 65a should move to position 65b (FIG. 10) back to the plane 465—65b, which is parallel to the tangent plane of the notch at point 471. 70b—65b is then the new position of the normal.

In the view of FIG. 10, the normal 70b—65b appears parallel to the original position 470—465 of the normal at the small turning angles considered; and distance 70b—65b appears equal to distance 470—465. This is an indication that the inclination of the normal to the plane of the index plate has not been changed, that is, to a plane perpendicular to the axis 461. In mathematical language, when the normal is moved through infinitesimal angles, its change in inclination is negligible. In other words, the new normal represents the same pressure angle as the initial one.

In the view along the axis 461 of the index plate (FIG. 9) the normal 70b—65b appears inclined to a plane 472 which is laid through the original normal 470—465 parallel to the axis 461 of the index plate. In this view this plane coincides with the projected normal 470—465. The normal 70b—65b intersects this plane at a point 475. It is seen, then, that the two normals 470—465 and 70b—65b of equal inclination to the plane of the index plate can be considered normals of a concavely curved conical surface 476, whose axis passes through point 475 and is parallel to the axis 461 of the index plate. In other words, a concavely curved conical surface of this description fulfills our requirement. It retains the contact between the sides of the notches and the sides of the locking member in positions moderately away from full depth position. It therefore provides the contact looked for in the correcting movement.

A similar construction can be made on the other side. There a normal 465—479 (FIG. 10) is considered. It results in an axis 478 (FIG. 9) of a concave conical surface 474.

The described geometric construction can be laid down in algebraic terms, assuming:

R = the radius from the axis 461 to the point 465.
r = the distance 463—465 (FIG. 8).
r' = r.cos a (angle a see FIG. 8).
$R_x$ = 465—475 (FIG. 9).
φ = pressure angle = the inclination of normal 470—465 to a plane perpendicular to the axis 461 of the index plate (see FIG. 10).

Using these symbols, the following formula is obtained:

$$\frac{1}{R_x} = \frac{\tan \phi}{\tan a}\left(\frac{1}{r'} - \frac{1}{R}\right)$$

The term within the parenthesis becomes zero when r' is equal to R, that is, when the pivot axis 463 intersects axis 461 of the index plate, and extends at right angles thereto. In this case $$\frac{1}{R_x}$$

becomes zero; $R_x$ is infinitely large. The axis of the conical surface is then infinitely far away in plane 472. The conical surface itself has become a plane.

FIGS. 11 and 12 illustrate this case. The pivot axis 483 of the locking dog 482 intersects the axis 481 of the index plate 480 and extends at right angles thereto. The side surfaces 484 of a notch 485 of the index plate are straight. They are planes.

It should be understood that the above general procedure determines a requirement to be fulfilled to obtain the desired property. It does not determine the surface completely. There are indeed an infinite number of solutions. The simplest and most practical one has been picked.

The above procedure is also applicable to the case where the locking dog is movable in the direction of the axis of the index plate without turning or tilting. However, an analysis is unnecessary to this case. The side surfaces of the notch in this case should simply be helical surfaces. Helical surfaces have the property that they continue in surface contact when they are displaced relatively to each other along their axis, and are kept in engagement by a relative turning motion about their axis. The term "helical surfaces" as used here is meant to indicate helical surfaces of constant lead, surfaces such as may be described by turning a line on an axis and moving it simultaneously along said axis at a constant proportion to said turning motion.

Accordingly, notches with helical side surfaces conform to the principles of the present invention when used together with matching locking dogs movable in the direction of the axis of said surfaces and of the index plate.

In FIGS. 13 and 14, the index plate 486 has notches 487 having bottoms 488 preferably of constant width from end to end. The notches 487 extend from the inner end 490 of the face 491 of the index plate to its outer end 492. The locking dog 493 is movable in the direction of the axis 494 of the index plate to and from locking position. The side surfaces 495 of the notch are helical surfaces of opposite hand, and each contains helices of a given lead. At the inner end of the face their profiles are as indicated in full lines at 496 in FIG. 15. At the outer end they are as indicated in dotted lines at 497. In other words, the sides of the notches have varying pressure angles, pressure angles which increase from the inner end of a notch to its outer end.

The side surfaces of the end 498 of the locking dog 493 engaging the notch are also helical surfaces matching the helical surfaces of the notch, either with full surface contact, or with some ease-off.

The varying pressure angle increases the cost of production of the index plate and locking dog.

One helicoid, however, has a constant normal pressure angle and a constant inclination of its surface normals. This is the involute helicoid. It is indicated in FIG. 16. Each notch 500 of index plate 501 has side surfaces 502, 503 which extend along involutes 504 lengthwise. The involutes have a common base circle 505 concentric with the axis 506 of the index plate. The involute helicoids are perpendicular to all planes tangent to the base circle 505 which are parallel to the axis of the index plate. 508 is one such plane, which is normal to a notch 500 and also to the other notches, if extended. An index plate of this kind has a constant cross-section from end to end of a notch, such a cross-section being indicated in FIG. 17. This facilitates production.

FIG. 13 can also be considered an axial section of the index plate 501 of FIG. 16. The locking member is movable in the direction of the axis of the index plate and has side surfaces which match the involute helical notch.

Production can further be simplified when the involute helicoids are approximated by circular arcs. Thus, the notch 510 of index plate 511 of FIG. 18 extends along a circular arc centered at 512 on or near the base circle 513 of the involute it approximates. The sides 514, 515 of each notch 510 may be made coaxial conical surfaces, whose axis passes through the center 512 and is parallel to the axis 516 of the index plate. The end of the locking dog then also has conical side surfaces matching the side surfaces of the notches 510.

While the invention has been described in connection with several different embodiments thereof, it is capable of further modification and use, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In an indexing mechanism, a rotary index plate having a plurality of circumferentially spaced notches, each notch having opposite side surfaces and a bottom surface connecting said side surfaces, said side surfaces converging in depthwise direction so that the width of the notch is smaller at its bottom than at its top, and means for intermittently locking said index plate against rotation, comprising a movably mounted locking dog positioned to engage a notch of said index plate, said dog having side surfaces that are matching counterparts of the side surfaces of said notches at least approximately, thereby to achieve surface contact with the side surfaces of said notches when said dog is in engagement with a notch and means for moving said dog in a generally depthwise directions to and from locking engagement with a notch of said plate, the shape of the sides of each notch being such that the normal at a mean point of contact between a side of a notch and the mating side of the locking dog tends to stay normal to the side of the notch when said normal is moved with said locking dog slightly away from the position of full depth engagement of the dog with the notch, while the side of the locking dog is maintained in contact with the side of the notch.

2. In an indexing mechanism as claimed in claim 1, wherein said index plate has a plurality of angularly-spaced notches on one side face, said locking dog is pivotally mounted on an axis which is offset from the axis of said index plate and which lies in a plane perpendicular to the axis of said index plate, said locking dog has a portion adapted to engage a notch of said index plate, said portion being adapted to engage the sides of said notch approximately with surface contact, both sides of said notch being longitudinally concave surfaces of revolution whose axes are parallel to the axis of said index plate.

3. In an indexing mechanism as claimed in claim 1, wherein said index plate has a plurality of angularly-spaced notches on one side face, said locking dog is pivotally mounted on an axis intersecting the axis of said index plate at right angles, and said locking dog has a portion adapted to engage a notch of said index plate with approximate surface contact, both sides of said notch being planes.

4. In an indexing mechanism as claimed in claim 1, wherein said index plate has a plurality of angularly-spaced notches on one side face, said locking dog is mounted for movement in the direction of the axis of said plate and has a portion adapted to engage a notch of said plate, the side surfaces of the notch and of said portion being at least approximately helical surfaces coaxial with said plate.

5. In an indexing mechanism as claimed in claim 1, wherein said index plate has a plurality of angularly-spaced notches on one side face, said locking dog is mounted for movement in the direction of the axis of said plate and has a portion adapted to engage a notch of said plate, said notch extending obliquely and in a curve across said face and having side surfaces which are involute helicoids at least approximately, the base cylinder of said helicoids being coaxial with said index plate.

6. In an indexing mechanism as claimed in claim 1, wherein said index plate has a plurality of angularly-spaced notches on one side face, said locking dog is mounted for movement in the direction of the axis of said plate and has a portion adapted to engage a notch of said plate, said notch extending obliquely and in a curve across said face and having side surfaces which are conical surfaces approximating involute helicoids, opposite sides of a notch being coaxial conical surfaces.

7. In an indexing mechanism, a rotatable index plate having a plurality of angularly-spaced notches around its periphery, said notches extending parallel to the axis of the index plate, and means for intermittently locking said index plate against rotation, comprising a locking dog, means for pivotally mounting said locking dog on an axis parallel to the axis of said index plate, said locking dog having a portion adapted to engage a notch of said index plate and having approximately surface contact with the sides of the notch in engaged position, the profile of the notch side which is nearer to the pivot of said locking dog being convex and the profile of the opposite side of the notch being concave, and said locking dog having mating side profiles which are concave and convex, respectively.

8. In an indexing mechanism, a rotatable index plate having a plurality of angularly-spaced notches around its periphery, said notches extending parallel to the axis of said index plate, a locking dog, means for pivotally mounting said locking dog for movement about an axis parallel to the axis of said index plate, said locking dog having a portion adapted to engage a notch of the index plate, the side profiles of the notch and of said portion being circular arcs, the two side profiles of a notch being convex and concave, respectively, and having their centers adjacent a line connecting the pivot axis of said locking dog with the axis of said index plate when the dog is in full depth engagement with the notch.

9. In an indexing mechanism, a rotatable index plate having a plurality of angularly-spaced notches around its periphery, said notches extending parallel to the axis of said index plate, a locking dog, means for pivotally mounting said locking dog for movement about an axis parallel to the axis of said index plate, said locking dog having a portion adapted to engage a notch of the index plate, the side profiles of the notch and of said portion being convex and concave circular arcs whose centers lie adjacent a straight line which connects the axes of the index plate and locking dog in the position of full depth engagement of the dog and notch, the center of each convex arc lying on the opposite side of said line from the center of the mating concave arc.

10. In an indexing mechanism, a rotatable index plate having a plurality of angularly-spaced notches around its periphery, said notches extending longitudinally parallel to the axis of said plate, and means for intermittently locking said plate against rotation, comprising a locking dog adapted to engage a notch of said plate, means for pivotally mounting said locking dog, the side profiles of each notch being of convex and of concave shape, respectively, and said dog having mating side profiles which are concave and convex, respectively, the profile of a notch side which, when engaged by said dog, is nearer the pivot of said locking dog being convex, and the centers of the two opposite sides of the engaged notch lying approximately on a line connecting said pivot with the axis of said plate.

11. In an indexing mechanism, two members rotatable relatively to one another, one of said members being provided with at least one notch, said notch having two opposite side surfaces and a bottom surface connecting said side surfaces, said side surfaces converging in depthwise direction so that the width of the notch is smaller at its bottom than at its top, and a locking dog movably mounted on the other of said two members for depthwise movement into and out of engagement with said notch, said dog having side surfaces that are matching counterparts of the side surfaces of said notch at least approximately, thereby to achieve surface contact with said notch when said dog is in engagement with said notch, and said dog when engaged with said notch serving to lock the two members together, the shape of the sides of said notch being such that the normal at a mean point of contact between one side of said notch and the mating side of said dog tends to stay normal to said one side of said notch when said normal is moved with said dog slightly away from the position of full depth engagement of said dog with said notch while said mating side of said dog is maintained in engagement with said one side of said notch.

12. In an indexing mechanism, two members rotatable relatively to one another about an axis, one of said members having at least one notch extending parallel to said axis, a locking dog, means for pivotally mounting said locking dog on the other of said members for movement about an axis parallel to said axis to engage said notch, thereby to lock the said two members together, the side profiles of the notch and of the portion of said dog which engages said notch being convex and concave circular arcs whose centers lie adjacent a straight line which, in the full depth engagement of said dog with said notch, connects the first-named axis with the pivotal axis of said dog, the center of each convex arc lying on the opposite side of said line from the center of the mating concave arc.

References Cited in the file of this patent

UNITED STATES PATENTS

| 1,012,053 | Basley | Dec. 19, 1911 |
| 1,711,037 | Bojer | Apr. 30, 1929 |
| 1,877,789 | Barrett | Sept. 20, 1932 |
| 2,674,062 | Tull | Apr. 6, 1954 |
| 2,709,504 | Mamo | May 31, 1955 |

FOREIGN PATENTS

| 781,957 | France | Mar. 4, 1935 |